US008994783B2

(12) United States Patent
Ino

(10) Patent No.: US 8,994,783 B2
(45) Date of Patent: Mar. 31, 2015

(54) IMAGE PICKUP APPARATUS THAT AUTOMATICALLY DETERMINES SHOOTING MODE MOST SUITABLE FOR SHOOTING SCENE, CONTROL METHOD THEREFOR, AND STORAGE MEDIUM

(75) Inventor: Kazuya Ino, Yokohama (JP)

(73) Assignee: Canon Kabushiki Kaisha (JP)

( * ) Notice: Subject to any disclaimer, the term of this patent is extended or adjusted under 35 U.S.C. 154(b) by 473 days.

(21) Appl. No.: 13/307,094

(22) Filed: Nov. 30, 2011

(65) Prior Publication Data

US 2012/0133730 A1    May 31, 2012

(30) Foreign Application Priority Data

Nov. 30, 2010   (JP) .................................. 2010-266971

(51) Int. Cl.
| | |
|---|---|
| *H04N 7/00* | (2011.01) |
| *H04N 3/16* | (2006.01) |
| *H04N 5/228* | (2006.01) |
| *H04N 5/232* | (2006.01) |

(52) U.S. Cl.
CPC ................. *H04N 5/23245* (2013.01)
USPC ....................... 348/36; 348/208.99; 348/222.1

(58) Field of Classification Search
CPC ............ H04N 5/23238; H04N 5/2628; H04N 5/2259; H01J 31/502; G04F 13/026
USPC .................................... 348/36, 22.1
See application file for complete search history.

(56) References Cited

U.S. PATENT DOCUMENTS

| | | | |
|---|---|---|---|
| 4,203,671 | A | 5/1980 | Takahashi et al. |
| 2005/0052553 | A1* | 3/2005 | Kido et al. ...................... 348/296 |
| 2008/0204565 | A1* | 8/2008 | Yumiki ...................... 348/208.99 |
| 2009/0179994 | A1* | 7/2009 | Miyazaki ................... 348/208.4 |
| 2009/0201390 | A1 | 8/2009 | Mimura |
| 2010/0182442 | A1 | 7/2010 | Maeng |

FOREIGN PATENT DOCUMENTS

| | | | |
|---|---|---|---|
| JP | 52156624 A | | 12/1977 |
| JP | 7203285 A | | 8/1995 |
| JP | 8-063597 A | | 3/1996 |
| JP | 08-138045 A | | 5/1996 |
| JP | 2003-344891 A | | 12/2003 |
| JP | 2003-344891 A | * | 12/2003 |

OTHER PUBLICATIONS

European Search Report issued in counterpart application No. EP11190617.8, dated Mar. 30, 2012.

* cited by examiner

*Primary Examiner* — Dave Czekaj
*Assistant Examiner* — Tsion B Owens
(74) *Attorney, Agent, or Firm* — Rossi, Kimms & McDowell LLP

(57) ABSTRACT

An image pickup apparatus that is capable of controlling the time elapsing from when a shooting scene is determined to when switching between shooting mode is performed, thus making it possible to take images desired by a user. A motion of the image pickup apparatus is detected, and based on the detection result, a motion of the image pickup apparatus is determined. A shooting scene is determined based on a video signal obtained from the image pickup unit. A shooting mode is determined based on the result of scene determination. Based on the result of determination, the ease of switching to the determined shooting mode is changed.

18 Claims, 6 Drawing Sheets

| | | | | | | |
|---|---|---|---|---|---|---|
| MOTION INFORMATION | PAN (SLOW) | STATIONARY | PAN(QUICK) | COME TO STANDSTILL AFTER PANNING(QUICK) | STATIONARY | |
| SCENE INFORMATION | A A A B B B B B B B A A B B B A A B A B B A A A A A A A A A B A | | | | | |
| COEFFICIENT | K2 | K3 | K4 | K1 | K3 | |
| SHOOTING MODE | A | B | | | A | |

K1 < K2 < K3 < K4

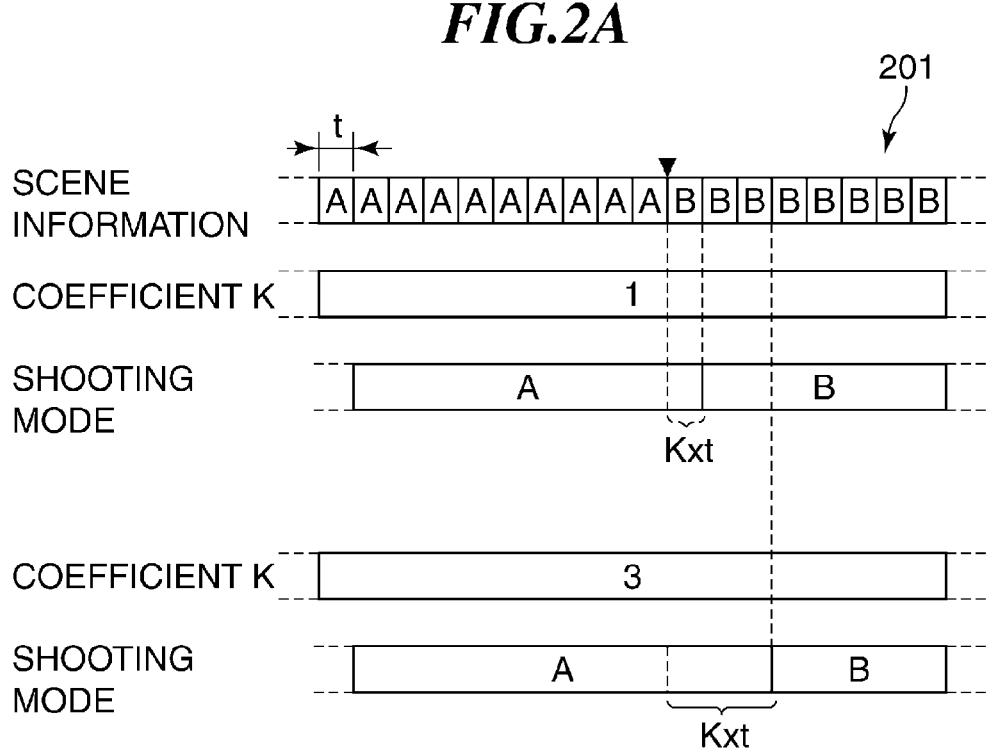
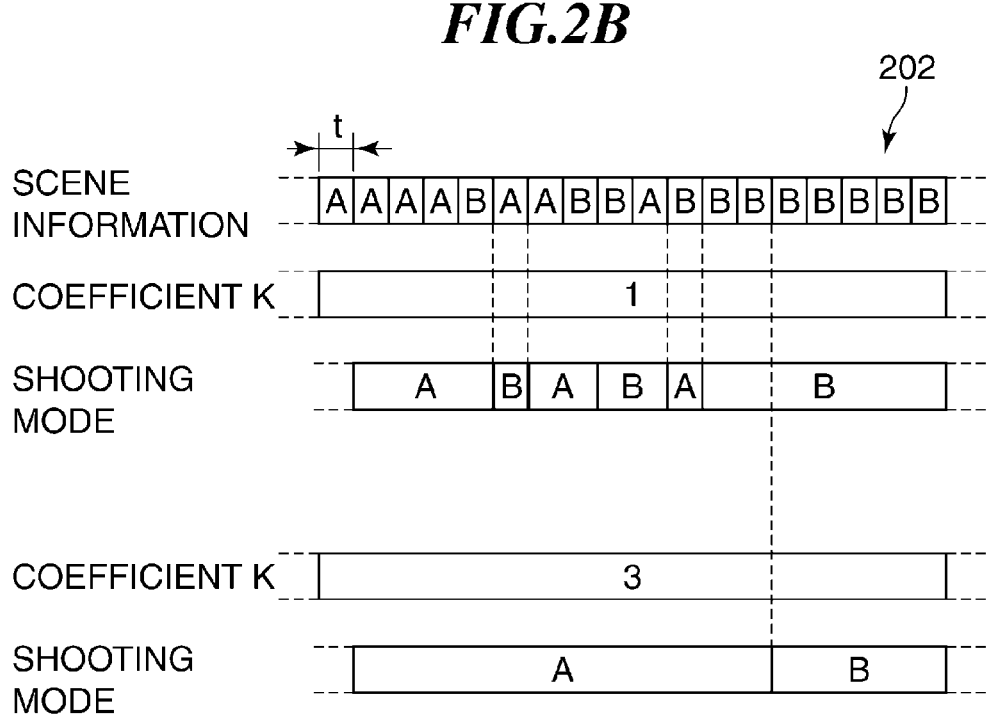

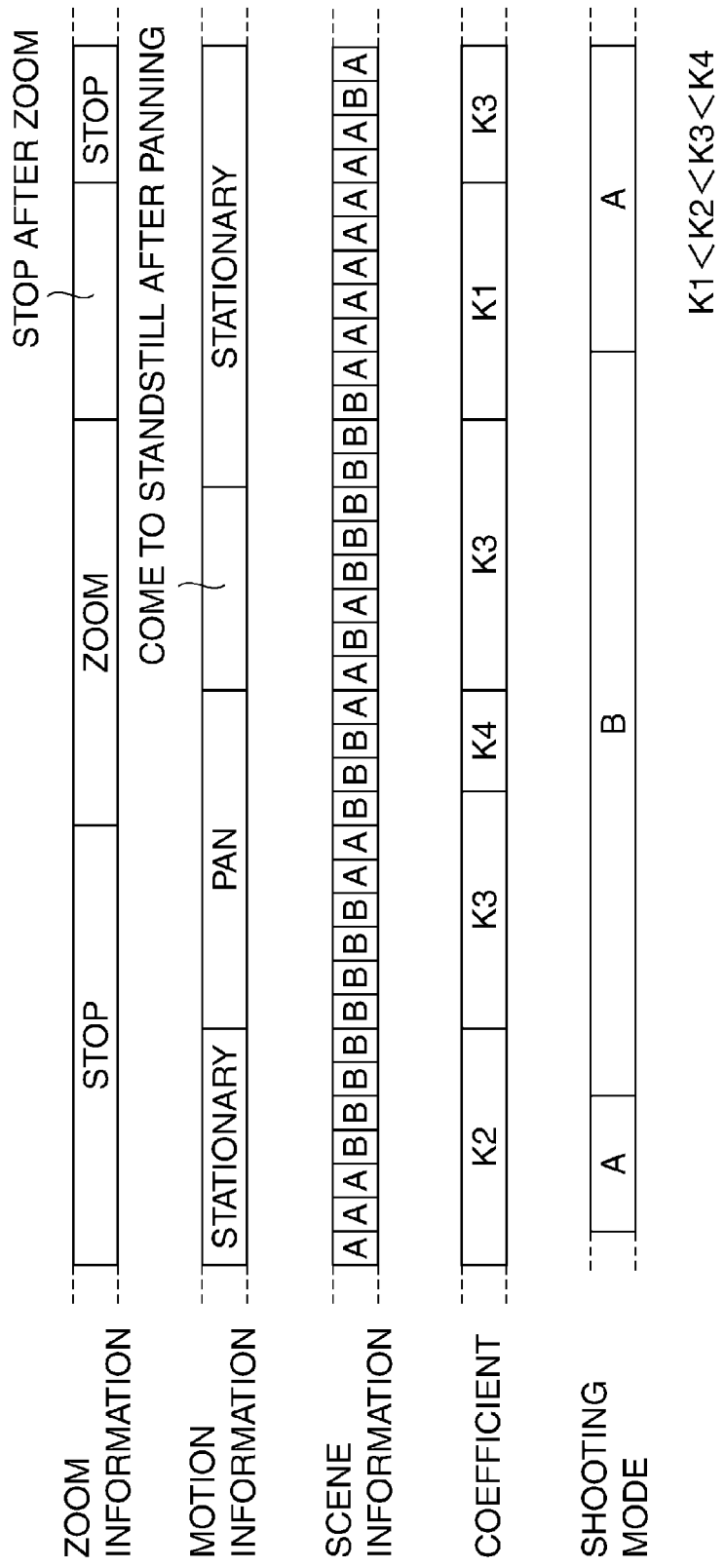

IMAGE PICKUP APPARATUS THAT AUTOMATICALLY DETERMINES SHOOTING MODE MOST SUITABLE FOR SHOOTING SCENE, CONTROL METHOD THEREFOR, AND STORAGE MEDIUM

BACKGROUND OF THE INVENTION

1. Field of the Invention

The present invention relates to an image pickup apparatus and a control method therefor, and particularly to an image pickup apparatus that determines a shooting scene based on a video signal and automatically determines the most suitable shooting mode for the shooting scene among a plurality of shooting modes, a control method therefor, and a computer-readable storage medium storing a program for implementing the method.

2. Description of the Related Art

In recent years, image pickup apparatuses such as digital cameras and video cameras have become increasingly automated, and there have been developed image pickup apparatuses which have the function of automatically switching between shooting modes according to scenes shot by a user. Examples of the function of automatically switching between shooting modes include switching between shooting modes by determining a face and motion of a subject (see, for example, Japanese Laid-Open Patent Publication (Kokai) No. 2003-344891). In Japanese Laid-Open Patent Publication (Kokai) No. 2003-344891, the technique that a shooting mode for a camera is set based on information output from a face recognition means for recognizing whether or not a subject includes a face, and a means for detecting a state of the subject.

However, in conventional image pickup apparatuses, the time elapsing from when a shooting scene is determined to when a shooting mode is determined is fixed irrespective of user's intent. When the time elapsing from when a shooting scene is determined to when a shooting mode is determined is too short, problems explained hereafter arise. For example, when moving images are being taken, shooting modes are changed at short time intervals every time shooting conditions such as the focal length of a lens and a face and motion of a subject change, which deteriorates the stability of taken images, and thus images desired by the user cannot be taken. Also, when the time elapsing from when a shooting scene is determined to when a shooting mode is determined is too long, the responsiveness of shooting modes decreases when a user purposefully changes shooting conditions, and thus images desired by the user cannot be taken.

SUMMARY OF THE INVENTION

The present invention provides an image pickup apparatus that is capable of controlling the time elapsing from when a shooting scene is determined to when switching between shooting mode is performed, thus making it possible to take images desired by a user, a control method therefor, and a computer-readable storage medium storing a program for implementing the method.

Accordingly, a first aspect of the present invention provides an image pickup apparatus including an image pickup unit that takes moving images and outputs a video signal, comprising a motion detecting unit configured to detect a motion of the image pickup apparatus, a motion determination unit configured to determine a motion of the image pickup apparatus based on a result of detection by the motion detecting unit, a scene determination unit configured to determine a shooting scene based on the video signal obtained from the image pickup unit, and a shooting mode determination unit configured to determine a shooting mode based on a result of determination by the scene determination unit, wherein based on a result of determination by the motion determination unit, the shooting mode determination unit changes the ease of switching to the determined shooting mode.

Accordingly, a second aspect of the present invention provides a control method for an image pickup apparatus including an image pickup unit that takes moving images and outputs a video signal, comprising a motion detecting step of detecting a motion of the image pickup apparatus, a motion determination step of determining a motion of the image pickup apparatus based on a result of detection in said motion detecting step, a scene determination step of determining a shooting scene based on the video signal obtained from the image pickup unit, and a shooting mode determination step of determining a shooting mode based on a result of determination in said scene determination step, wherein based on a result of determination in said motion determination step, the ease of switching to the determined shooting mode in said shooting mode determination step is changed.

Accordingly, a third aspect of the present invention provides a computer-readable non-transitory storage medium storing a program for causing an image pickup apparatus to implement a control method as described above.

According to the present invention, when the user does not change scenes, the stability of taken images is improved, and when the user changes scenes, responsiveness is improved, so that images desired by the user can be taken.

Further features of the present invention will become apparent from the following description of exemplary embodiments (with reference to the attached drawings).

BRIEF DESCRIPTION OF THE DRAWINGS

FIGS. 2A and 2B are timing charts useful in explaining how shooting modes are switched, in which FIG. 2A shows a case where scene information switches from a scene A to a scene B, and FIG. 2B shows a case where scene information finely switches between the scene A and the scene B.

FIG. 6 is a timing chart useful in explaining an operation in which a coefficient K is determined with respect to each shooting mode based on motion information and zoom information according to a third embodiment of the present invention.

DESCRIPTION OF THE EMBODIMENTS

The present invention will now be described in detail with reference to the drawings showing embodiments thereof.

Figure 1:
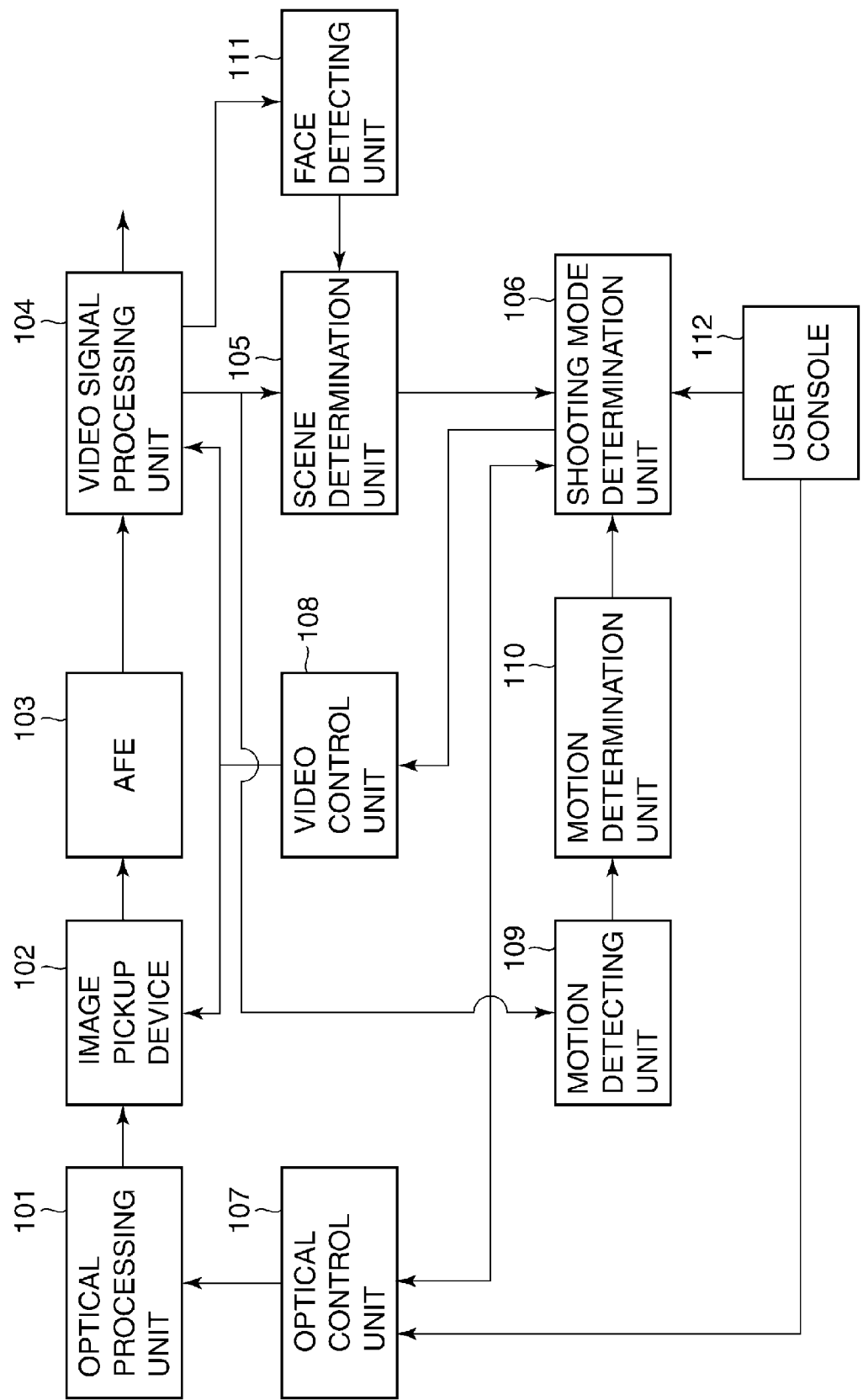
FIG. 1 is a block diagram schematically showing an exemplary arrangement of an image pickup apparatus according to a first embodiment of the present invention.

FIG. 1 is a block diagram schematically showing an exemplary arrangement of an image pickup apparatus according to a first embodiment of the present invention.

The image pickup apparatus has a function of taking moving images and has an arrangement described below. An optical processing unit 101 is comprised of an optical lens, a diaphragm, and so on, and has an optical zoom function. An image pickup device 102 is comprised of a CCD (charge coupled device) sensor, a CMOS (complementary metal oxide semiconductor) sensor, or the like as hardware. An AFE 103 is an AFE (analog front end) which converts an analog video signal output from the image pickup device 102 into a digital video signal. A video signal processing unit 104 carries out various types of image processing on a digital video signal output from the AFE 103.

A scene determination unit 105 determines a shooting scene based on a digital video signal (hereafter referred to merely as a "video signal") acquired from the video signal processing unit 104. A shooting mode determination unit 106 determines a shooting mode based on the result of scene determination by the scene determination unit 105. An optical control unit 107 controls the optical processing unit 101.

A video control unit 108 controls the image pickup device 102 and the video signal processing unit 104. A motion detecting unit 109 detects a motion of the image pickup apparatus itself or a subject. A motion determination unit 110 determines a motion of the image pickup apparatus based on the result of detection by the motion detecting unit 109.

A face detecting unit 111 detects whether or not there is a face in a video signal. The above described components 103 to 111 may be comprised of hardware such as circuits or comprised of software modules or the like.

A user console 112 is a user interface having a shutter switch, a zoom key, and so on as hardware. Operational inputs to the user console 112 are input as signals to the shooting mode determination unit 106 and the optical control unit 107.

A description will be given of how components of the image pickup apparatus in FIG. 1 operate.

A video signal which has been passed through the optical processing unit 101 and subjected to photoelectrical conversion by the image pickup device 102 is subjected to A/D conversion by the AFE 103 and then subjected to video signal processing related to an image pickup system such as aperture correction, gamma correction, and white balance by the video signal processing unit 104. The video signal output from the video signal processing unit 104 is input to the face detecting unit 111 and the scene determination unit 105.

The face detecting unit 111 detects the face of a subject using a technical means. Examples of the technical means include a method in which flesh color data is extracted from an input video signal, and a cluster of photometric measurement points determined as being a flesh color area is regarded as a face (Japanese Laid-Open Patent Publication (Kokai) No. 552-156624), and a method in which a face region is determined based on feature amounts of the shape of a human face (Japanese Laid-Open Patent Publication (Kokai) No. H08-063597). It should be noted that the face detecting method is not limited to them.

The result of face detection by the face detecting unit 111 is input as a signal to the scene determination unit 105.

The scene determination unit 105 determines a shooting scene based on the signal indicative of the face detection result by the face detection unit 111 as well as the video signal, and outputs the determination result as scene information to the shooting mode determination unit 106. For example, when one face is detected, the scene determination unit 105 determines that the shooting scene is a portrait scene. When no human face is detected, and a background is bright, the scene determination unit 105 determines that the shooting scene is a landscape scene, and when no human face is detected, and a background is dark, the scene determination unit 105 determines that the shooting scene is a night scene (see Japanese Laid-Open Patent Publication (Kokai) No. 2003-344891).

The shooting mode determination unit 106 determines the best suitable shooting mode for the shooting scene among a plurality of shooting modes based on the scene information transmitted from the scene determination unit 105. A detailed description will be given later of how the shooting mode determination unit 106 operates.

In accordance with the shooting mode determined by the shooting mode determination unit 106, the optical control unit 107 controls the optical processing unit 101 to perform zooming, focusing, aperture, photometric measurement, and so on. In accordance with the shooting mode determined by the shooting mode determination unit 106, a video control unit 108 controls, for example, white balance, color balance, NR, γ, shutter speed, and so on of the video signal for the image pickup device 102 and the video signal processing unit 104. Namely, because shooting modes are changed, images having the same brightness may differ in shutter speed, aperture value, or the like, and images having the same color saturation or the same hue may differ in color balance, NR intensity, or the like.

The motion detecting unit 109 detects a motion of the image pickup apparatus itself or a subject. Examples of detection methods include a method using a vibratory gyroscope disposed so as to detect angular velocity in a pitch direction and a yaw direction relative to an optical axis, and a motion vector detection method in which the amount of movement per unit time is measured from the temporal correlation between video signals. It should be noted that the detection method should not be limited to these detection methods.

Based on the result of detection from the motion detecting unit 109, the motion determination unit 110 determines a motion of the image pickup apparatus, for example, whether or not the image pickup apparatus is stationary, or whether or not the image pickup apparatus is being moved in a panning direction or a tilting direction. Specifically, when detection output level exceeds a threshold value for a predetermined time period or longer, the motion determination unit 110 determines that the image pickup apparatus is panning or tilting (see Japanese Laid-Open Patent Publication (Kokai) No. H07-203285). In the following description, it is assumed that in the present embodiment, when the image pickup apparatus is moved in a panning direction, it is determined that the image pickup apparatus is panning, and when the image pickup apparatus is moved in a tilting direction, it is determined that the image pickup apparatus is tilting. The result of determination by the motion determination unit 110 is input as motion information to the shooting mode determination unit 106.

A description will now be given of operations performed by the mode determination unit 106.

FIGS. 2A and 2B are timing charts useful in explaining how shooting modes are switched based on scene information transmitted form the scene determination unit 105. FIG. 2A shows a case where scene information switches from a scene A to a scene B, and FIG. 2B shows a case where scene information finely switches between a scene A to a scene B.

Scene information 201, 202 in the figure is output at a predetermined time intervals t from the scene determination unit 105 to the shooting mode determination unit 106. The shooting mode determination unit 106 measures the number of times the same scene information is output, and upon determining that the number of times the same scene information is output is equal to or more than a coefficient K set in advance, the shooting mode determination unit 106 switches to a shooting mode suitable for the shooting scene. When scene information switches from a scene A to a scene B, the time required for switching from a shooting mode A suitable for the scene A to a shooting mode B suitable for the scene B is K×t. The time (K×t) is a time period from when a shooting scene is determined to when switching between shooting mode is performed. For example, as for the scene information 201 in FIG. 2A, when the coefficient K is 1, switching between shooting modes is performed after the lapse of a time t, and when the coefficient K is 3, shooting mode is switched after the lapse of a time (3×t). Thus, in the case where scene information is switched without fluctuations as above, when the coefficient K is 1, the time elapsing from when a shooting scene is determined to when switching between shooting modes is performed is short, but when the coefficient K is 3, the time elapsing from when a shooting scene is determined to when switching between shooting modes is performed is long.

On the other hand, when scene information finely switches as is the case with the scene information 202 in FIG. 2B, when the coefficient K is 1, switching between shooting modes is frequently performed, but when the coefficient K is 3, switching between shooting modes is less likely to be affected by fluctuations in scene determination. Namely, when the coefficient K is small, stability is low although responsiveness is high, but when the coefficient K is large, stability is high although responsiveness is low. Accordingly, in the present embodiment, the coefficient K is adaptively controlled according to motion information on the image pickup apparatus so as to change the ease of switching between shooting modes.

Figure 3:
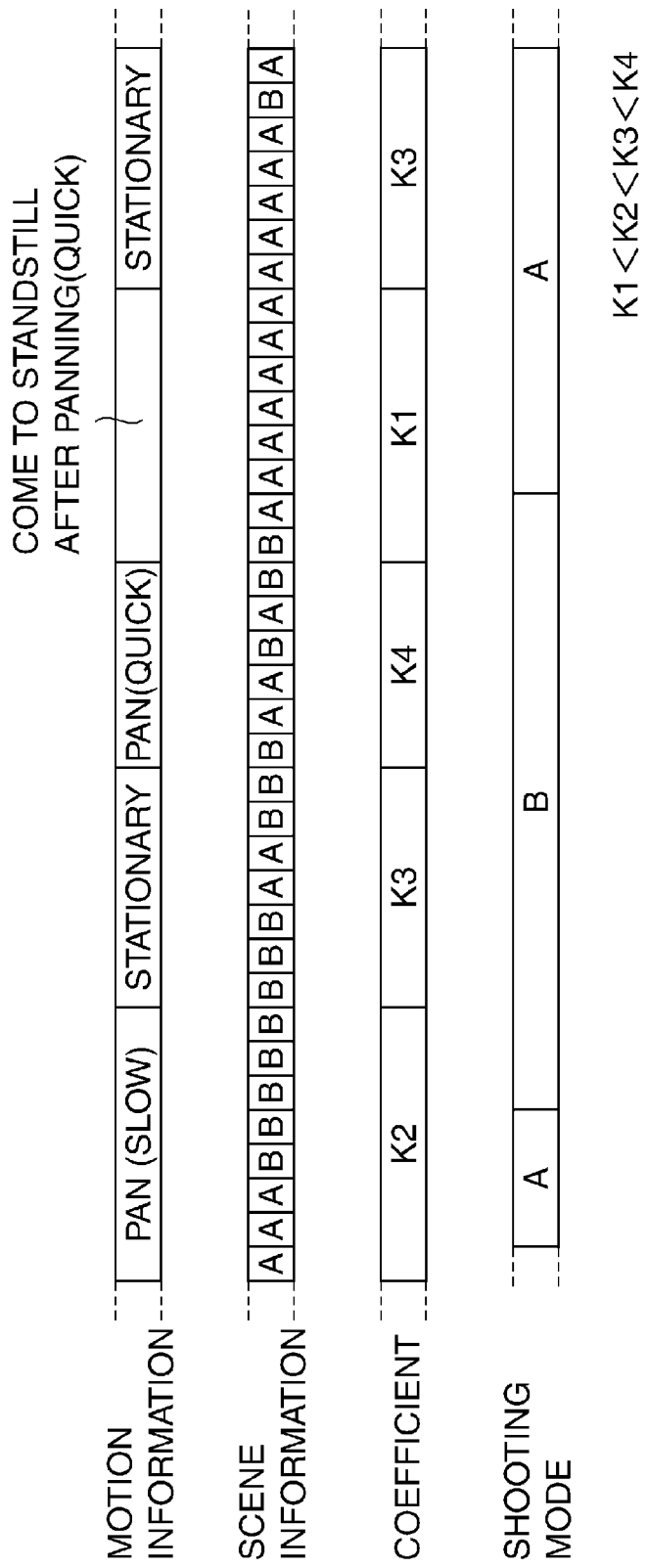
FIG. 3 is a timing chart useful in explaining an operation in which a coefficient K is determined based on motion information input from a motion determination unit.
Figure 4:
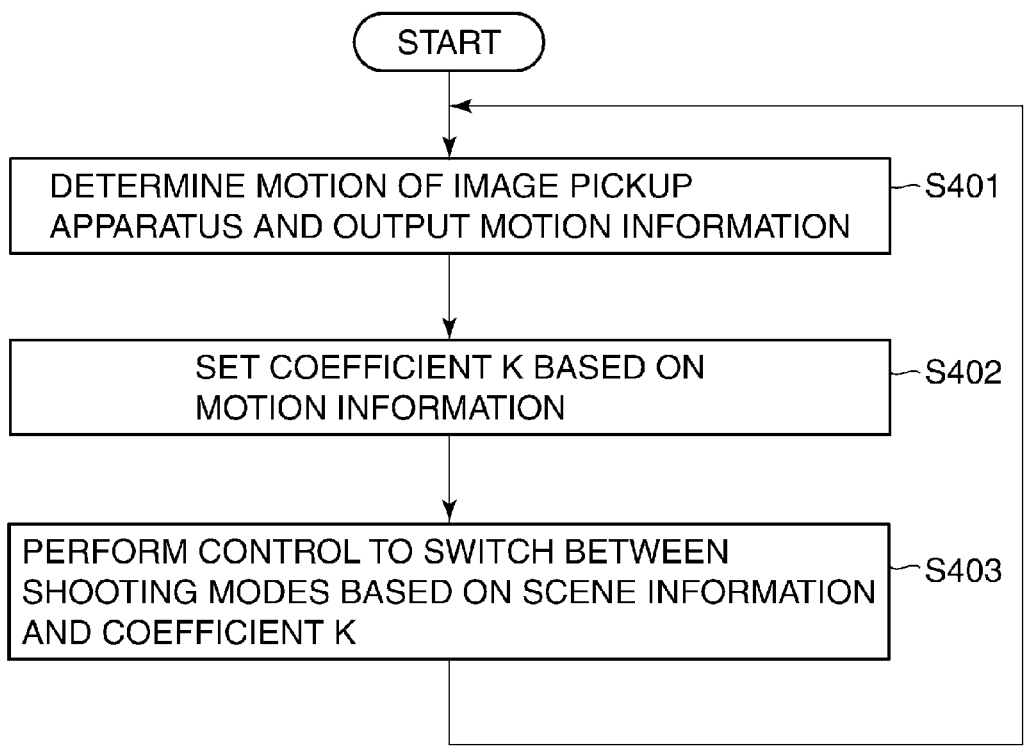
FIG. 4 is a flowchart showing the process in FIG. 3.

FIG. 3 is a timing chart useful in explaining an operation in which the coefficient K is determined based on motion information input from the motion determination unit 110. FIG. 4 is a flowchart showing the operation in FIG. 3.

First, in step S401, based on the result of detection from the motion detecting unit 109, the motion determination unit 110 determines, for example, whether the image pickup apparatus is stationary, panning, or tilting. At this time, the motion determination unit 110 may also determine the velocity at which the image pickup apparatus is panning or tilting. Moreover, the motion determination unit 110 may record panning/tilting operations and moving/stationary states of the image pickup apparatus, and based on the recorded operating status of the past, may determine whether the image pickup apparatus comes to a standstill after quick panning or tilting.

Thus, based on the above described determination result, the motion determination unit 110 of the present embodiment detects the following four motions, a moving/stationary state of the image pickup apparatus, a slow panning operation, a quick panning operation, and coming to a standstill after a quick panning action, and outputs the detected motions as motion information to the shooting mode determination unit 106. Motion information may comprise different numbers and combinations of motions in other embodiments.

Then, in step S402, the shooting mode determination unit 106 sets the coefficient K based on the motion information. For example, when the motion information is indicative of a stationary state ("STATIONARY" in the figure), it is thought that the user is continuing to shoot a subject, and it is determined that high stability and low responsiveness may be set, and thus the coefficient K is set at 3 (K3). When the motion information is indicative of a slow panning action ("PAN (SLOW)" in the figure), it is determined that certain levels of responsiveness and stability are required because the user is purposefully changing subjects, and thus the coefficient K is set at 2 (K2) which is smaller than 3 (K3). When the motion information is indicative of a quick panning action ("PAN (QUICK)" in the figure), it is determined that responsiveness is not required because the user is likely to do camera work so as to shoot the next subject, and thus the coefficient K is set at 4(K4) which is the greatest value. When the motion information is indicative of a quick panning action after coming to a standstill ("COME TO STANDSTILL AFTER PANNING (QUICK)" in the figure), it is determined that responsiveness should be increased because the user is thought to be starting to shoot a desired subject, and thus the coefficient K is set at 1 (K1) which is the smallest value. It will be understood that in general, values of K1, K2, K3 etc. need not be integers, and need not be fixed multiples, while still maintaining an order such as that defined by the relationship above.

In the above described way, the shooting mode determination unit 106 sets the coefficients K1 to K4 so that they can have the relationship $K1 \leq K2 \leq K3 \leq K4$.

Then, in step S403, the shooting mode determination unit 106 provides control to switch between shooting modes based on the scene information and the coefficient K.

As a result, when the image pickup apparatus is stationary or quickly panning, images can be prevented from being affected by short-cycle switching between shooting modes. Further, switching between shooting modes is performed immediately after the image pickup apparatus comes to a standstill.

According to the present embodiment, based on scene information obtained by determining a shooting scene from a video signal and motion information obtained by determining a motion of the image pickup apparatus or a subject, the shooting mode determination unit 106 changes the coefficient K relating to the time elapsing from when a shooting scene is determined to when switching between shooting modes is performed. The shooting mode determination unit 106 provides control to switch between shooting modes based on the scene information and the coefficient K. As a result, when the user is not changing shooting scenes, the stability of taken images is improved, and when the user is changing shooting scenes, responsiveness is improved, so that images desired by the user can be taken.

A description will now be given of an image pickup apparatus according to a second embodiment of the present invention.

The arrangement of the image pickup apparatus according to the second embodiment of the present invention is the same as that of the image pickup apparatus according to the first embodiment described above with reference to FIG. 1. Thus, the corresponding parts are designated by the same reference symbols, and description thereof is omitted, only features that are different from those of the first embodiment being described below.

In the second embodiment, coefficients K corresponding to motion information are set in advance with respect to respective ones of a plurality of shooting modes, and the shooting mode determination unit 106 changes the coefficient K based on scene information and motion information.

Figure 5:
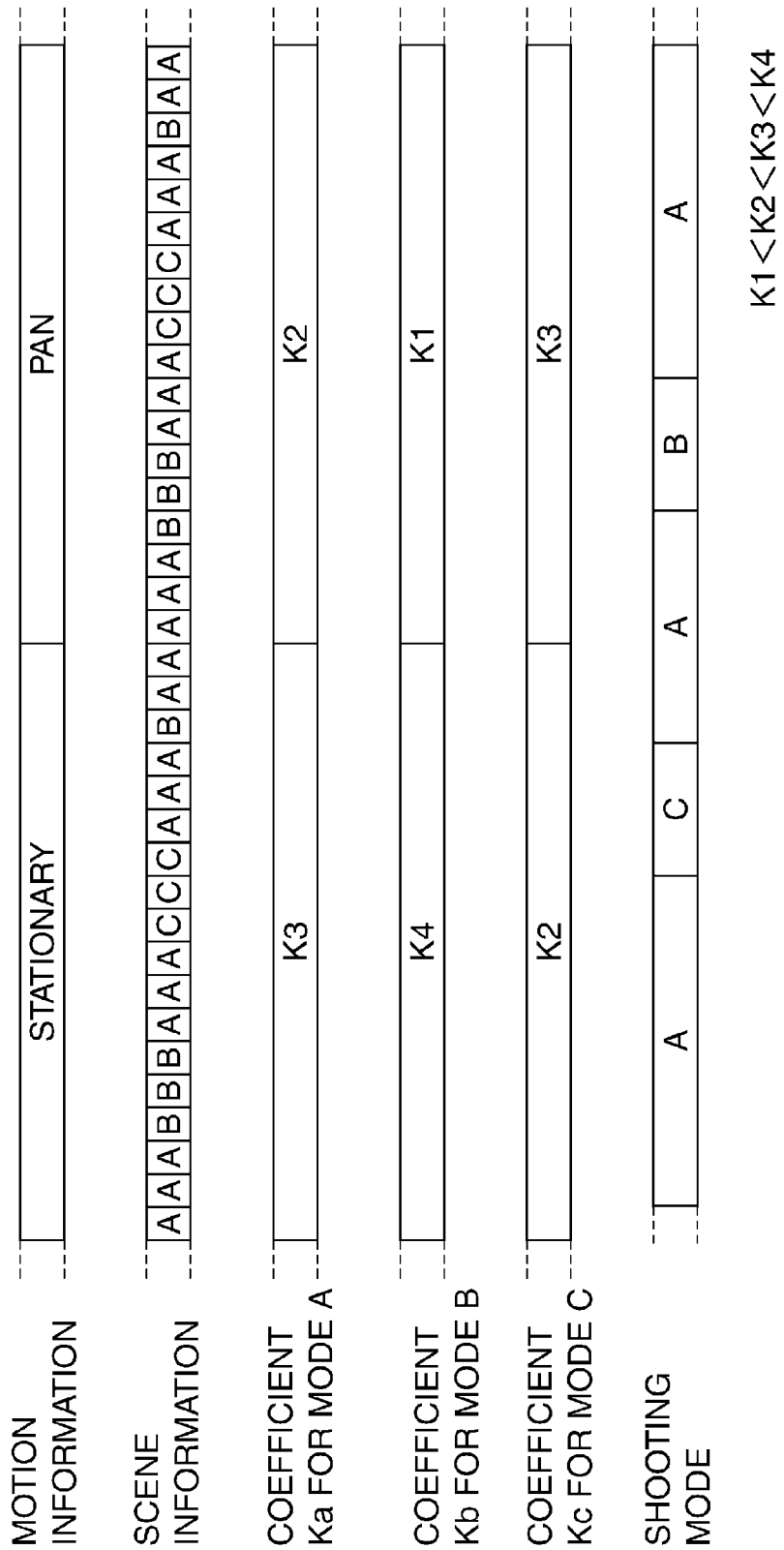
FIG. 5 is a timing chart useful in explaining an operation in which a coefficient K is determined with respect to each shooting mode based on motion information according to a second embodiment of the present invention.

FIG. 5 is a timing chart useful in explaining an operation in which the coefficient K is determined with respect to each shooting mode based on motion information according to the second embodiment of the present invention. It should be noted that the operation in FIG. 5 will be described with reference to FIG. 4.

First, based on the result of detection from the motion detecting unit 109, the motion determination unit 110 determines whether the image pickup apparatus is stationary, panning, or tilting (this is equivalent to the step S401). At this time, the scene determination unit 105 can discriminate between a plurality of scenes, and in the present embodiment, for example, the scene determination unit 105 discriminates between a scene A, a scene B, and a scene C. A shooting mode corresponding to the scene A is designated by A, a shooting mode corresponding to the scene B is designated by B, and a shooting mode corresponding to the scene C is designated by C.

Then, based on the motion information, the shooting mode determination unit 106 sets coefficients Ka, Kb, and Kc corresponding to the shooting modes A, B, and C (this is equivalent to the step S402). For example, when the motion information is indicative of a stationary state ("STATIONARY" in the figure), the coefficient Ka is set at K3, the coefficient Kb is set at K4 which is greater than K3, and the coefficient Kc is set at K2 which is smaller than K3. When the motion information is indicative of a panning state ("PAN" in the figure), the coefficient Ka is set at K2, the coefficient Kb is set at K1 which is smaller than K2, and the coefficient Kc is set at K3 which is greater than K2. Thus, the shooting mode determination unit 106 sets the coefficients K1 to K4 so that they can have the relationship K$1 \leq K2 \leq K3 \leq K4$.

In the concrete example described above, the ease of shifting between shooting modes can be controlled such that in the stationary state, the shooting mode is likely to switch to the shooting mode C, but less likely to switch to the shooting mode B, and in the panning state, the shooting mode is likely to switch to the shooting mode B, but less likely to switch to the shooting mode C. Namely, control can be performed such that even when a person comes in view of the image pickup apparatus while the user is shooting while keeping the image pickup apparatus at a standstill, the shooting mode is less likely to switch to a portrait mode, and during panning/tilting, the shooting mode is likely to be switched to a landscape mode but less likely to be switched to a backlight mode. It should be noted that the coefficients Ka, Kb, and Kc for the respective shooting modes may be values set in advance, or may be arbitrarily changed by the user according to subjects he/she is going to shoot. When the coefficients Ka, Kb, and Kc are to be changed, the user console 112 is used, and information on the change is input from the user console 112 to the shooting mode determination unit 106.

It should be noted that as is the case with the first embodiment described above, the motion determination unit 110 may be configured to detect the following four motions of the image pickup apparatus, a moving/stationary state, a slow panning operation, a quick panning operation, and coming to a standstill after quick panning, and outputs the detected motions as motion information to the shooting mode determination unit 106. Other motions are of course possible.

According to present embodiment, based on scene information and motion information, the shooting mode determination unit 106 changes the coefficient K relating to the time elapsing from when shooting scene is determined to when switching between shooting modes is performed. The shooting mode determination unit 106 then provides control to switch between shooting modes based on the scene information and the coefficient K. As a result, switching between shooting modes can be better controlled, and images desired by the user can be taken.

A description will now be given of an image pickup apparatus according to a third embodiment of the present invention.

The arrangement of the image pickup apparatus according to the third embodiment of the present invention is the same as that of the image pickup apparatus according to the first embodiment described with reference to FIG. 1. Thus, the corresponding parts are designated by the same reference symbols, and description thereof is omitted, only features that are different from those of the first embodiment being described below.

In the third embodiment, the shooting mode determination unit 106 changes the coefficient K based on scene information and motion information as well as information on zooming performed through operation by the user.

FIG. 6 is a timing chart useful in explaining an operation in which a coefficient K is determined with respect to each shooting mode based on motion information and information on zooming according to the third embodiment of the present invention. It should be noted that the operation in FIG. 6 will be described with reference to FIG. 4.

First, as is the case with the first embodiment described embodiment, based on the detection result of detection from the motion detecting unit 109, the motion determination unit 110 determines whether the image pickup apparatus is stationary, panning, or tilting (this is equivalent to the step S401). At this time, the motion determination unit 110 may detect the velocity of a panning/tilting operation. The motion determination unit 110 may record results of determination as to panning/tilting operations including velocities of the panning/tilting operations, and moving/stationary states of the image pickup apparatus, and based on those recorded operational states of the past, the motion determination unit 110 can determine whether or not the image pickup apparatus has come to a standstill after a quick panning operation or tilting operation.

At the time of the determination made by the motion determination unit 110, the user console 112 instructs the optical control unit 107 to drive a lens through depression of the zoom key, not shown, and outputs a zoom status of the optical processing unit 101 (zoom unit) as zoom information to the shooting mode determination unit 106.

Thus, based on the determination result described above, the motion determination unit 110 detects a motion of the image pickup apparatus such as moving/stationary, panning/tilting, or coming to a standstill after panning according to user's camera work, and outputs the detected motion as motion information to the shooting mode determination unit 106. Also, the shooting mode determination unit 106 detects a zooming operation, for example, turning-on (zooming)/off (stop) of zooming, or stop after zooming as zoom information according to user's camera work. At this time, the shooting mode determination unit 106 acts as a zoom determination unit.

Then, based on the motion information and the zoom information, the shooting mode determination unit 106 sets the coefficient K (this is equivalent to the step S402). For example, when the motion information is indicative of a stationary state and the zoom information is indicative of a stop state, it is determined that high stability and low responsiveness can be set because the user is thought to be continuing to shooting the same subject, and thus the coefficient K is set at K3. When the motion information is indicative of a panning state and the zoom information is indicative of a stop state, or when the motion information is indicative of a stationary state and the zoom information is indicative of zooming underway, it is determined that certain levels of responsiveness and stability are required because the user is purposefully changing subjects, and thus the coefficient K is set at K2 which is smaller than K3.

When the motion information is indicative of a panning state and the zoom information is indicative of zooming underway, it is determined that responsiveness is not required because the user is likely to do camera work so as to shoot the next subject, and thus the coefficient K is set at K4 which is the greatest value. On the other hand, when the motion information is indicative of a stationary state after panning and the zoom information is indicative of a stop state, or when the motion information is indicative of a stationary state and zoom information is indicative of a stop after zooming, the user is thought to be starting to shoot a desired subject, and thus the coefficient K is set at K1 which is the smaller than K2 so that responsiveness should be increased.

In the above described way, the shooting mode determination unit 106 sets the coefficients K1 to K4 so that they can have the relationship K1≤K2≤K3≤K4. Then, the shooting mode determination unit 106 provides control to switch between shooting modes based on the scene information and the coefficient K.

As a result, when the image pickup apparatus is stationary, panning, or zooming, images can be prevented from being affected by short-cycle switching between shooting modes. Further, switching between shooting modes is performed immediately after the image pickup apparatus comes to a standstill.

According to the present embodiment, based on scene information, motion information and zoom information, the shooting mode determination unit 106 changes the coefficient K relating to the time elapsing from when shooting scene is determined to when switching between shooting modes is performed. The shooting mode determination unit 106 then provides control to switch between shooting modes based on the scene information and the coefficient K. As a result, when the user is not changing shooting scenes, the stability of taken images is improved, and when the user is changing shooting scenes, responsiveness is improved, so that images desired by the user can be taken.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-266971 filed Nov. 30, 2010, which is hereby incorporated by reference herein in its entirety.

What is claimed is:

1. An image pickup apparatus including an image pickup unit that takes moving images and outputs a video signal, comprising:
   a motion detecting unit configured to detect a motion of the image pickup apparatus;
   a motion determination unit configured to determine a motion of the image pickup apparatus based on a result of detection by said motion detecting unit;
   a scene determination unit configured to determine a shooting scene based on the video signal obtained from the image pickup unit;
   a motion coefficient setting unit configured to set a motion coefficient based on the result of determination by said motion determination unit;
   a shooting mode determination unit configured to determine a shooting mode of the image pickup apparatus based on a result of determination by said scene determination unit, to measure the number of times the same results of determination by said scene determination unit are continuously output, and to switch, when the measured number of times reaches the set motion coefficient, the shooting mode to another shooting mode of the image pickup apparatus corresponding to the same results of determination by said scene determination unit; and
   a control unit configured to control the image pickup unit according to the another shooting mode switched by the shooting mode determination unit,
   wherein said motion detecting unit detects the motion of the image pickup apparatus based on a motion of the image pickup apparatus itself or a motion of a subject obtained from the video signal.

2. An image pickup apparatus including an image pickup unit that takes moving images and outputs a video signal, comprising:
   a motion detecting unit configured to detect a motion of the image pickup apparatus;
   a motion determination unit configured to determine a motion of the image pickup apparatus based on a result of detection by said motion detecting unit;
   a scene determination unit configured to determine a shooting scene based on the video signal obtained from the image pickup unit;
   a motion coefficient setting unit configured to set a motion coefficient based on the result of determination by said motion determination unit;
   a shooting mode determination unit configured to determine a shooting mode of the image pickup apparatus based on a result of determination by said scene determination unit, to measure the number of times the same results of determination by said scene determination unit are continuously output, and to switch, when the measured number of times reaches the set motion coefficient, the shooting mode to another shooting mode of the image pickup apparatus corresponding to the same results of determination by said scene determination unit; and
   a control unit configured to control the image pickup unit according to the another shooting mode switched by the shooting mode determination unit,
   wherein in a case where said motion determination unit determines that the image pickup apparatus is moving in a panning direction and/or a tilting direction, said motion coefficient setting unit sets the motion coefficient at a first value, and in a case where said motion determination unit determines that the image pickup apparatus has come to a standstill after panning and/or tilting, said motion coefficient setting unit sets the motion coefficient at a second value which is smaller than the first value.

3. An image pickup apparatus including an image pickup unit that takes moving images and outputs a video signal, comprising:
   a motion detecting unit configured to detect a motion of the image pickup apparatus;
   a motion determination unit configured to determine a motion of the image pickup apparatus based on a result of detection by said motion detecting unit;

a scene determination unit configured to determine a shooting scene based on the video signal obtained from the image pickup unit;
a zoom unit configured to perform optical zooming;
a zoom determination unit configured to determine a state of said zoom unit;
a motion coefficient setting unit configured to set a motion coefficient based on the result of determination by said motion determination unit and a zoom state determined by said zoom determination unit;
a shooting mode determination unit configured to determine a shooting mode of the image pickup apparatus based on a result of determination by said scene determination unit, to measure the number of times the same results of determination by said scene determination unit are continuously output, and to switch, when the measured number of times reaches the set motion coefficient, the shooting mode to another shooting mode of the image pickup apparatus corresponding to the same results of determination by said scene determination unit; and
a control unit configured to control the image pickup unit according to the another shooting mode switched by the shooting mode determination unit.

4. An image pickup apparatus according to claim 3, wherein when said motion determination unit determines that the image pickup apparatus is moving in a panning direction and/or a tilting direction, and said zoom determination unit determines that zooming is underway, said motion coefficient setting unit sets the motion coefficient at a first value, and in a case where said motion determination unit determines that the image pickup apparatus has finished panning and/or tilting, and/or said zoom determination unit determines that the image pickup apparatus has stopped after zooming is performed, said motion coefficient setting unit sets the motion coefficient at a second value which is smaller than the first value.

5. An image pickup apparatus including an image pickup unit that takes moving images and outputs a video signal, comprising:
a motion detecting unit configured to detect a motion of the image pickup apparatus;
a motion determination unit configured to determine a motion of the image pickup apparatus based on a result of detection by said motion detecting unit;
a scene determination unit configured to determine a shooting scene based on the video signal obtained from the image pickup unit;
a motion coefficient setting unit configured to set a motion coefficient based on the result of determination by said motion determination unit;
a shooting mode determination unit configured to determine a shooting mode of the image pickup apparatus based on a result of determination by said scene determination unit, to measure the number of times the same results of determination by said scene determination unit are continuously output, and to switch, when the measured number of times reaches the set motion coefficient, the shooting mode to another shooting mode of the image pickup apparatus corresponding to the same results of determination by said scene determination unit; and
a control unit configured to control the image pickup unit according to the another shooting mode switched by the shooting mode determination unit,
wherein motion coefficients are set in advance for each of a plurality of shooting modes.

6. An image pickup apparatus according to claim 5, wherein the motion coefficients are set by a user.

7. A control method for an image pickup apparatus including an image pickup unit that takes moving images and outputs a video signal, comprising:
a motion detecting step of detecting a motion of the image pickup apparatus;
a motion determination step of determining a motion of the image pickup apparatus based on a result of detection in said motion detecting step;
a scene determination step of determining a shooting scene based on the video signal obtained from the image pickup unit;
a motion coefficient generating step of generating a motion coefficient based on the result of determination in said motion determination step;
a shooting mode determination step of determining a shooting mode based on a result of determination in said scene determination step, measuring the number of times the same results of determination in said scene determination step are continuously output, and switching, when the measured number of times reaches the generated motion coefficient, the shooting mode to another shooting mode of the image pickup apparatus corresponding to the same results of determination in said scene determination step; and
a control step of controlling the image pickup unit according to the another shooting mode switched in said shooting mode determination step,
wherein the motion of the image pickup apparatus is detected based on a motion of the image pickup apparatus itself or a motion of a subject obtained from the video signal.

8. A computer-readable non-transitory storage medium storing a program for causing an image pickup apparatus, including an image pickup unit that takes moving images and outputs a video signal, to implement a control method for the image pickup apparatus, the control method comprising:
a motion detecting step of detecting a motion of the image pickup apparatus;
a motion determination step of determining a motion of the image pickup apparatus based on a result of detection in said motion detecting step;
a scene determination step of determining a shooting scene based on the video signal obtained from the image pickup unit;
a motion coefficient generating step of generating a motion coefficient based on the result of determination in said motion determination step;
a shooting mode determination step of determining a shooting mode based on a result of determination in said scene determination step, measuring the number of times the same results of determination in said scene determination step are continuously output, and switching, when the measured number of times reaches the generated motion coefficient, the shooting mode to another shooting mode of the image pickup apparatus corresponding to the same results of determination in said scene determination step; and
a control step of controlling the image pickup unit according to the another shooting mode switched in said shooting mode determination step,
wherein the motion of the image pickup apparatus is detected based on a motion of the image pickup apparatus itself or a motion of a subject obtained from the video signal.

9. An image pickup apparatus including an image pickup unit that takes moving images and outputs a video signal, comprising:
- a motion detecting unit configured to detect a motion of the image pickup apparatus;
- a motion determination unit configured to determine a motion of the image pickup apparatus based on a result of detection by said motion detecting unit;
- a scene determination unit configured to determine a shooting scene based on the video signal obtained from the image pickup unit;
- a motion coefficient setting unit configured to set a motion coefficient based on the result of determination by said motion determination unit;
- a shooting mode determination unit configured to determine a shooting mode of the image pickup apparatus based on a result of determination by said scene determination unit, to measure the number of times the same results of determination by said scene determination unit are continuously output, and to switch, when the measured number of times reaches the set motion coefficient, the shooting mode to another shooting mode of the image pickup apparatus corresponding to the same results of determination by said scene determination unit; and
- a control unit configured to control the image pickup unit according to the another shooting mode switched by the shooting mode determination unit,
- wherein in a case where said motion determination unit determines that the image pickup apparatus is moving in a panning direction and/or a tilting direction, said motion coefficient setting unit sets the motion coefficient at a first value, and in a case where said motion determination unit determines that the image pickup apparatus is not moving in the panning direction and/or the tilting direction, said motion determination unit sets the motion coefficient at a second value which is smaller than the first value.

10. An image pickup apparatus including an image pickup unit that takes moving images and outputs a video signal, comprising:
- a motion detecting unit configured to detect a motion of the image pickup apparatus;
- a motion determination unit configured to determine a motion of the image pickup apparatus based on a result of detection by said motion detecting unit;
- a scene determination unit configured to determine a shooting scene based on the video signal obtained from the image pickup unit;
- a motion coefficient setting unit configured to set a motion coefficient based on the result of determination by said motion determination unit;
- a shooting mode determination unit configured to determine a shooting mode of the image pickup apparatus based on a result of determination by said scene determination unit, to measure the number of times the same results of determination by said scene determination unit are continuously output, and to switch, when the measured number of times reaches the set motion coefficient, the shooting mode to another shooting mode of the image pickup apparatus corresponding to the same results of determination by said scene determination unit; and
- a control unit configured to control the image pickup unit according to the another shooting mode switched by the shooting mode determination unit,
- wherein in a case where said motion determination unit determines that the image pickup apparatus is not moving in a panning direction and/or a tilting direction, said motion coefficient setting unit sets the motion coefficient at a first value, and in a case where said motion determination unit determines that the image pickup apparatus is moving in the panning direction and/or the tilting direction, said motion determination unit sets the motion coefficient at a second value which is smaller than the first value.

11. An image pickup apparatus including an image pickup unit that takes moving images and outputs a video signal, comprising:
- a motion detecting unit configured to detect a motion of the image pickup apparatus;
- a motion determination unit configured to determine a velocity of motion of the image pickup apparatus based on a result of detection by said motion detecting unit;
- a scene determination unit configured to determine a shooting scene based on the video signal obtained from the image pickup unit;
- a motion coefficient setting unit configured to set a motion coefficient based on the result of determination by said motion determination unit;
- a shooting mode determination unit configured to determine a shooting mode of the image pickup apparatus based on a result of determination by said scene determination unit, to measure the number of times the same results of determination by said scene determination unit are continuously output, and to switch, when the measured number of times reaches the set motion coefficient, the shooting mode to another shooting mode of the image pickup apparatus corresponding to the same results of determination by said scene determination unit; and
- a control unit configured to control the image pickup unit according to the another shooting mode switched by the shooting mode determination unit.

12. An image pickup apparatus according to claim 11, wherein in a case where said motion determination unit determines that the velocity of motion of the image pickup apparatus is a first velocity, said motion coefficient setting unit sets the motion coefficient at first value, and in a case where said motion determination unit determines that the velocity of motion of the image pickup apparatus is a second velocity which is greater than the first velocity, said motion coefficient setting unit sets the motion coefficient at second value which is greater than the first value.

13. A control method for an image pickup apparatus including an image pickup unit that takes moving images and outputs a video signal, the method comprising:
- detecting a motion of the image pickup apparatus;
- determining a motion of the image pickup apparatus based on a result of the detected motion;
- determining a shooting scene based on a video signal obtained from the image pickup unit;
- setting a motion coefficient based on the determined motion of the image pickup apparatus;
- determining a shooting mode of the image pickup apparatus based on the determined shooting scene, measuring the number of times the same determined shooting scene is continuously output, and switching, when the measured number of times reaches the set motion coefficient, the shooting mode to another shooting mode of the image pickup apparatus corresponding to the same determined shooting scene; and controlling the image pickup unit according to the another shooting mode, wherein in a case where it is determined that the image pickup apparatus is moving in a panning direction and/or a tilting direction, the motion coefficient is set at a first value, and in a case where it is determined that the image pickup apparatus has come to a standstill after panning and/or tilting, the motion coefficient is set at a second value which is smaller than the first value.

14. A control method for an image pickup apparatus including an image pickup unit that takes moving images and outputs a video signal, the method comprising:

determining a motion of the image pickup apparatus;
determining a motion of the image pickup apparatus based on a result of the detected motion;
determining a shooting scene based on a video signal obtained from the image pickup unit;
performing, using a zoom unit, optical zooming;
determining a zoom state of the zoom unit;
setting a motion coefficient based on the determined motion of the image pickup apparatus and the determined zoom state;
determining a shooting mode of the image pickup apparatus based on the determined shooting scene, measuring the number of times the same determined shooting scene is continuously output, and switching, when the measured number of times reaches the set motion coefficient, the shooting mode to another shooting mode of the image pickup apparatus corresponding to the same determined shooting scene; and
controlling the image pickup unit according to the another shooting mode.

15. A control method for an image pickup apparatus including an image pickup unit that takes moving images and outputs a video signal, the method comprising:

detecting a motion of the image pickup apparatus;
determining a motion of the image pickup apparatus based on a result of the detected motion;
determining a shooting scene based on a video signal obtained from the image pickup unit;
setting a motion coefficient based on the determined motion of the image pickup apparatus;
determining a shooting mode of the image pickup apparatus based on the determined shooting scene, measuring the number of times the same determined shooting scene is continuously output, and switching, when the measured number of times reaches the set motion coefficient, the shooting mode to another shooting mode of the image pickup apparatus corresponding to the same determined shooting scene; and
controlling the image pickup unit according to the another shooting mode,
wherein motion coefficients are set in advance for each of a plurality of shooting modes.

16. A control method for an image pickup apparatus including an image pickup unit that takes moving images and outputs a video signal, the method comprising:

detecting a motion of the image pickup apparatus;
determining a motion of the image pickup apparatus based on a result of the detected motion;
determining a shooting scene based on a video signal obtained from the image pickup unit;
setting a motion coefficient based on the determined motion of the image pickup apparatus;
determining a shooting mode of the image pickup apparatus based on the determined shooting scene, measuring the number of times the same determined shooting scene is continuously output, and switching, when the measured number of times reaches the set motion coefficient, the shooting mode to another shooting mode of the image pickup apparatus corresponding to the same determined shooting scene; and
controlling the image pickup unit according to the another shooting mode,
wherein in a case where it is determined that the image pickup apparatus is moving in a panning direction and/or a tilting direction, the motion coefficient is set at a first value, and in a case where it is determined that the image pickup apparatus is not moving in the panning direction and/or the tilting direction, the motion coefficient is set at a second value which is smaller than the first value.

17. A control method for an image pickup apparatus including an image pickup unit that takes moving images and outputs a video signal, the method comprising:

detecting a motion of the image pickup apparatus;
determining a motion of the image pickup apparatus based on a result of the detected motion;
determining a shooting scene based on a video signal obtained from the image pickup unit;
setting a motion coefficient based on the determined motion of the image pickup apparatus;
determining a shooting mode of the image pickup apparatus based on the determined shooting scene, measuring the number of times the same determined shooting scene is continuously output, and switching, when the measured number of times reaches the set motion coefficient, the shooting mode to another shooting mode of the image pickup apparatus corresponding to the same determined shooting scene; and
controlling the image pickup unit according to the another shooting mode,
wherein in a case where it is determined that the image pickup apparatus is not moving in a panning direction and/or a tilting direction, the motion coefficient is set at a first value, and in a case where it is determined that the image pickup apparatus is moving in the panning direction and/or the tilting direction, the motion coefficient is set at a second value which is smaller than the first value.

18. A control method for an image pickup apparatus including an image pickup unit that takes moving images and outputs a video signal, the method comprising:

detecting a motion of the image pickup apparatus;
determining a velocity of motion of the image pickup apparatus based on a result of the detected motion;
determining a shooting scene based on a video signal obtained from the image pickup unit;
setting a motion coefficient based on the determined velocity of motion of the image pickup apparatus;
determining a shooting mode of the image pickup apparatus based on the determined shooting scene, measuring the number of times the same determined shooting scene is continuously output, and switching, when the measured number of times reaches the set motion coefficient, the shooting mode to another shooting mode of the image pickup apparatus corresponding to the same determined shooting scene; and
controlling the image pickup unit according to the another shooting mode.

* * * * *